US008566020B2

(12) United States Patent
Arrasvuori

(10) Patent No.: US 8,566,020 B2
(45) Date of Patent: Oct. 22, 2013

(54) METHOD AND APPARATUS FOR TRANSFORMING THREE-DIMENSIONAL MAP OBJECTS TO PRESENT NAVIGATION INFORMATION

(75) Inventor: Juha Henrik Arrasvuori, Tampere (FI)

(73) Assignee: Nokia Corporation, Espoo (FI)

(*) Notice: Subject to any disclaimer, the term of this patent is extended or adjusted under 35 U.S.C. 154(b) by 831 days.

(21) Appl. No.: 12/628,632

(22) Filed: Dec. 1, 2009

(65) Prior Publication Data

US 2011/0130949 A1 Jun. 2, 2011

(51) Int. Cl.
*G01S 1/00* (2006.01)
(52) U.S. Cl.
USPC .......................... 701/409; 345/419; 382/113
(58) Field of Classification Search
USPC .......... 701/428, 410; 345/419, 582, 426, 506; 340/990, 988, 995.24; 382/113
See application file for complete search history.

(56) References Cited

U.S. PATENT DOCUMENTS

| 7,116,341 B2 | 10/2006 | Ohto |
| 2008/0249703 A1 | 10/2008 | Matsuno et al. |
| 2008/0288893 A1 | 11/2008 | Nikkels et al. |
| 2009/0082960 A1* | 3/2009 | Ramaswamy et al. ........ 701/211 |
| 2009/0153549 A1 | 6/2009 | Lynch et al. |
| 2009/0171581 A1 | 7/2009 | Ushida et al. |
| 2009/0237328 A1 | 9/2009 | Gyorfi et al. |
| 2010/0283781 A1* | 11/2010 | Kriveshko et al. ............ 345/419 |

FOREIGN PATENT DOCUMENTS

| EP | 2 192 554 A1 | 6/2010 |
| JP | 2009276266 A | 11/2009 |
| WO | WO 2009/118911 A1 | 10/2009 |
| WO | WO 2009/130729 A2 | 10/2009 |
| WO | 2009/132677 A1 | 11/2009 |
| WO | WO 2009/143872 A1 | 12/2009 |
| WO | WO 2010/012311 A1 | 2/2010 |
| WO | 2010/040384 A1 | 4/2010 |

OTHER PUBLICATIONS

International Search Report for corresponding PCT Application No. PCT/FI2010/050984, May 18, 2011, pp. 1-5.
Written Opinion of the International Searching Authority for corresponding PCT Application No. PCT/FI2010/050984, May 18, 2011, pp. 1-8.

* cited by examiner

*Primary Examiner* — Thomas Black
*Assistant Examiner* — Luke Huynh
(74) *Attorney, Agent, or Firm* — Ditthavong Mori & Steiner, P.C.

(57) ABSTRACT

An approach is provided for presenting navigation information to a user. An image representing one or more three dimensional map objects is retrieved. A point on one of the map objects is selected. The one map object is transformed at the selected point to represent a navigational element. Presentation of the transformed map object is caused, at least in part, using a graphical user interface of a mobile device.

20 Claims, 10 Drawing Sheets

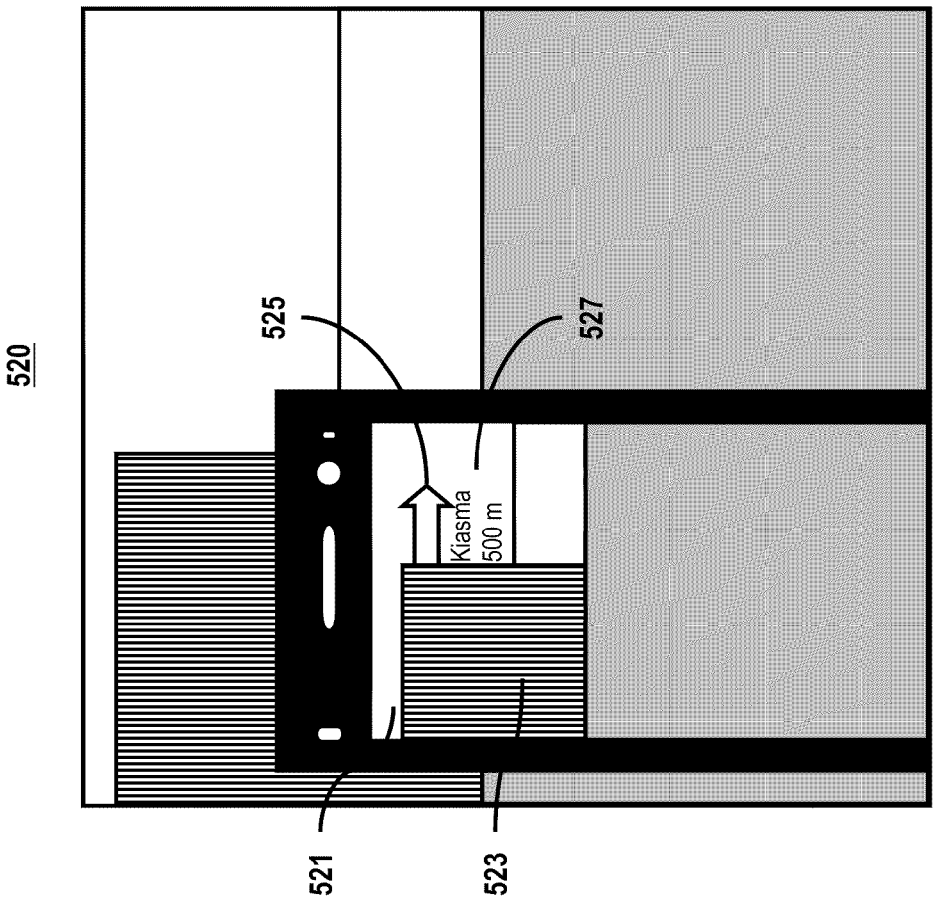
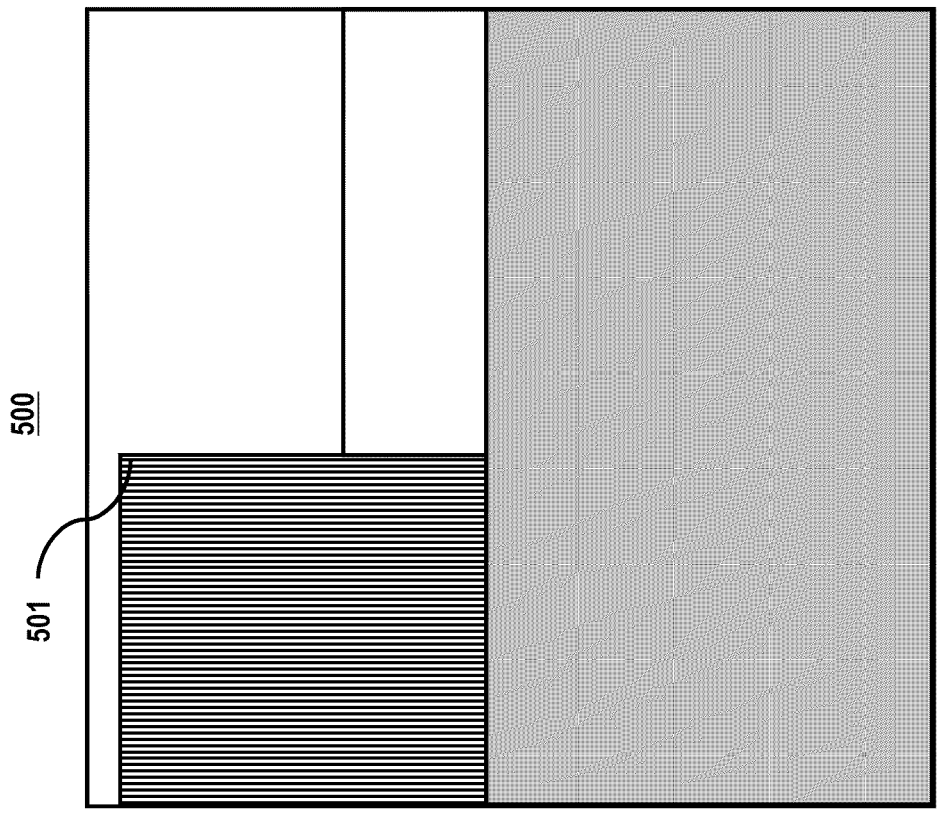

METHOD AND APPARATUS FOR TRANSFORMING THREE-DIMENSIONAL MAP OBJECTS TO PRESENT NAVIGATION INFORMATION

BACKGROUND

Service providers (e.g., wireless, cellular, etc.) and device manufacturers are continually challenged to deliver value and convenience to consumers by, for example, providing compelling network services. In particular, these services can include location and navigation services on a device. However, often user interfaces associated with these services do not or cannot provide adequate or complete navigational information on a screen of a user's device, particularly when the device is a mobile device with a limited display area. In other cases, the user interfaces may be presented in a way that limits the usability of the presented navigational information for a user. For example, users may not be able to understand the significance of objects displayed on the device because the interface is cluttered with additional objects. Thus, users are unable to fully utilize the available functions of the location or navigation services because the interface may be difficult or cumbersome. Accordingly, service providers and device manufacturers face significant technical challenges in providing user interfaces that present navigational information in ways that can be more easily and quickly understood by the user.

SOME EXAMPLE EMBODIMENTS

Therefore, there is a need for an approach for providing a user interface presenting navigational information via transforming three dimensional map objects.

According to one embodiment, a method comprises retrieving an image representing one or more three dimensional map objects. The method also comprises selecting a point on one of the map objects. The method further comprises transforming the one map object at the selected point to represent a navigational element. The method additionally comprises causing, at least in part, presentation of the transformed map object using a graphical user interface of a mobile device.

According to another embodiment, an apparatus comprising at least one processor, and at least one memory including computer program code, the at least one memory and the computer program code configured to, with the at least one processor, cause, at least in part, the apparatus to retrieve an image representing one or more three dimensional map objects. The apparatus is also caused to select a point on one of the map objects. The apparatus is further caused to transform the one map object at the selected point to represent a navigational element. The apparatus is additionally caused to cause, at least in part, presentation of the transformed map object using a graphical user interface of a mobile device.

According to another embodiment, a computer-readable storage medium carrying one or more sequences of one or more instructions which, when executed by one or more processors, cause, at least in part, an apparatus to retrieve an image representing one or more three dimensional map objects. The apparatus is also caused to select a point on one of the map objects. The apparatus is further caused to transform the one map object at the selected point to represent a navigational element. The apparatus is additionally caused to cause, at least in part, presentation of the transformed map object using a graphical user interface of a mobile device.

According to another embodiment, an apparatus comprises means for retrieving an image representing one or more three dimensional map objects. The apparatus also comprises means for selecting a point on one of the map objects. The apparatus further comprises means for transforming the one map object at the selected point to represent a navigational element. The apparatus additionally comprises means for causing, at least in part, presentation of the transformed map object using a graphical user interface of a mobile device.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5C are diagrams of user interfaces utilized in the processes of FIGS. 3 and 4A, according to various embodiments;

DESCRIPTION OF SOME EMBODIMENTS

Examples of a method, apparatus, and computer program for presenting navigational information via transforming three dimensional map objects are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
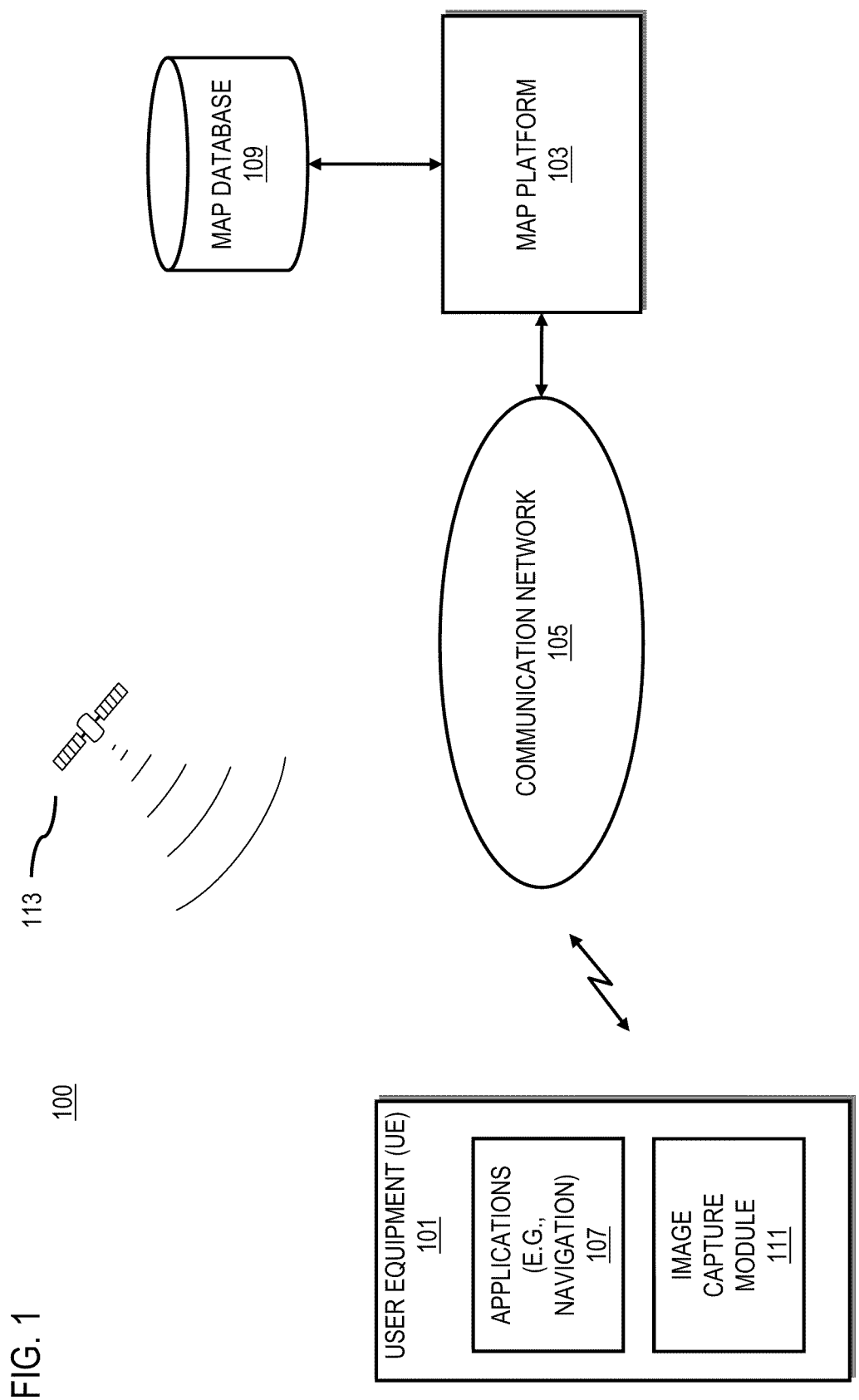
FIG. 1 is a diagram of a system including user equipment capable of providing a user interface presenting navigational information via transforming three dimensional map objects, according to one embodiment.

FIG. 1 is a diagram of a system including user equipment capable of providing a user interface for presenting navigational information via transforming three dimensional (3D)

map objects, according to one embodiment. It is becoming increasingly popular for service providers and device manufacturers to bundle or make available navigation and mapping services on an array of user devices (e.g., mobile handsets, computers, navigation devices, etc.) Such devices may utilize location based technologies (e.g., Global Positioning System (GPS) receivers, cellular triangulation, assisted-GPS (A-GPS), etc.) to provide navigation and mapping information. One growing trend for these services is to move beyond two-dimensional maps and provide location services based on 3D maps or representations of locations and/or routes of interest. For example, modern devices may utilize an augmented reality mode to superimpose graphics and text over video images showing buildings in front of the user. Moreover, certain devices may utilize 3D representations (e.g., rendered 3D models) of buildings and streets to provide navigational information. These devices may use separate graphical objects in place of or overlaid on actual images of buildings and streets to provide additional navigational information.

However, these conventional 3D-based interfaces can be rather cumbersome for displaying information on a user device. For example, in the case of a mobile device, the available display is generally limited and can quickly become cluttered when there are many elements (e.g., points-of-interest, navigation instructions, etc.) to display. This cluttered display makes it much more difficult for a user to quickly identify important navigational information. This quick identification is particularly crucial when the user is relying on real-time navigational instructions to reach a destination.

Additionally, many users may not be impressed by typical mundane representations and navigation user interfaces that are ubiquitous in current navigation services and devices. As such, users may become bored with the features of the device and begin to use the device with much less frequency. Moreover, such boredom can also cause users to miss important navigational information because they are no longer paying attention to or registering alerts or notices from the device.

To address this problem, a system 100 of FIG. 1 introduces the capability of presenting map or navigational information by transforming 3D map objects. With this approach, the system 100 determines map objects that may be of interest to the user and transforms the 3D representation of one or more of the objects to visually enhance the objects and make them more prominent to user. In this way, the system 100 can emphasize mapping or navigation information that may be important to a user in a way that will draw the user's attention to that information, thereby making it less likely that a user would overlook the information. As used herein, in certain embodiments, navigation information refers to information about the user's location (e.g., map coordinates), other locations (e.g., destinations, points-of-interests (POIs), relationships between locations (e.g., directions for traveling between the locations, relative positions of the locations, associations between the locations,), etc. A user equipment (UE) 101 may retrieve map information (e.g., 3D maps) from a map platform 103 via a communication network 105. The 3D maps may be utilized by applications 107 on the UE 101 (e.g., a navigation application 107). Moreover, the map information may be included in a map database 109 associated with the map platform 103. In certain embodiments, map information is information that may be utilized by the navigation application 107 to provide navigational information and guidance to the user. Map information may include maps, satellite images, street and path information, point of interest (POI) information, signing information associated with maps, objects and structures associated with the maps, information about people and the locations of people, coordinate information associated with the information, etc., or a combination thereof. A POI can be a specific point location that a person may, for instance, find interesting or useful. Examples of points-of-interest can include an airport, a bakery, a dam, a landmark, a restaurant, a hotel, the location of a person, or any point interesting, useful, or significant in some way. In some embodiments, the map information and the maps presented to the user may be a simulated 3D environment. In certain embodiments, the simulated 3D environment is a 3D model created to approximate the locations of streets, buildings, features, etc. of an area. This model can then be used to render the location from virtually any angle or perspective for display on the UE 101. In navigation programs (e.g., navigation application 107), the 3D model or environment enables, for instance, the navigation application 107 to animate movement through the 3D environment to provide a more dynamic and potentially more useful or interesting mapping display to the user. In one embodiment, structures are stored using simple objects (e.g., three dimensional models describing the dimensions of the structures). Further, more complex objects may be utilized to represent structures and other objects within the 3D representation. Complex objects may include multiple smaller or simple objects dividing the complex objects into portions or elements. To create the 3D model, object information can be collected from various databases as well as data entry methods such as processing images associated with location stamps to determine structures and other objects in the 3D model.

Additionally or alternatively, in certain embodiments, an image capture module 111 of the UE 101 may be utilized in conjunction with the navigation application 107 to present location information (e.g., mapping and navigation information) to the user. The user may be presented with an augmented reality interface associated with the navigation application 107 allowing 3D objects to be superimposed onto an image of a physical environment on the UE 101. 3D objects utilized by the navigation application 107 may be transformed to present navigation information to users. In certain embodiments, the user interface may display a hybrid physical and virtual environment where 3D objects from the map database 109 are placed superimposed on top of a physical image.

By way of example, the user of the UE 101 may utilize the navigation application 107 to receive navigation information. As mentioned above, under certain scenarios, the navigation information may include POI information, location information, directions or associations to a location, or a combination thereof. In one example, a default setting may allow the user to view information about POIs associated with buildings, structures, and other objects associated with the 3D environment. The user may point the user's UE 101 towards a building to view the POI information. The navigation application 107 may associate the building with location coordinates. Then, the navigation application 107 may retrieve POI information associated with the building from the map platform 103 based on the location information as further detailed in FIG. 2. Once POI information is associated with the building, a portion of the building or a 3D model of the building may be transformed into a 3D icon associated with the POI information. This transformation can improve the user's experience because a transition presentation may be utilized to notify and draw the attention of the user of the availability of the POI in the building. The transition presentation may be an animation of the transformation to present the POI information (e.g., an animation of the portion of the building object transforming into the POI icon). In other embodiments, the transition presentation animation may be accompanied by audio alerts or flourishes, multimedia displays, etc. to further draw the user's attention and increase user interest about specific navigation information. As such, the transition presentation (e.g., transformation of a portion of the 3D model) may provide a level of excitement for users to share their navigation experience with other friends or users.

In another example, the navigation information may include associations to a particular location. In this example, the user may point the UE 101 at an object in the real world (e.g., a building) that is represented by a 3D object in the 3D model environment. The navigation application 107 can determine a relationship between the particular location (e.g., an address of a friend of the user or a POI) and the 3D object. Then, a portion of the 3D object may be transformed, as further detailed in FIG. 4, to provide a directional indicator towards the particular location. This transformation may additionally improve the user's experience with the navigation application 107 by providing the user with more readily identifiable navigation information and encourage the user to share the abilities of the navigation application 107 with other friends.

Moreover, map information stored in the map database 109 may be created from 3D models of real-world buildings and other sites. As such, objects can be associated with real world locations (e.g., based on location coordinates such as global positioning system (GPS) coordinates). In certain embodiments, the UE 101 may utilize GPS satellites 113 to determine the location of the UE 101 to utilize the map information. The map information may include a 3D model (e.g., a complex 3D model) of objects and structures in a physical environment (e.g., buildings) made up of a number of separate but adjoined simple 3D shapes such as polygons. Conventional approaches of 3D modeling include the ability to access and transform each polygon in size and shape separately from the other polygons that form the complete 3D model of the object.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, navigational device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, and map platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the navigation application 107 and the map platform 103 may interact according to a client-server model. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
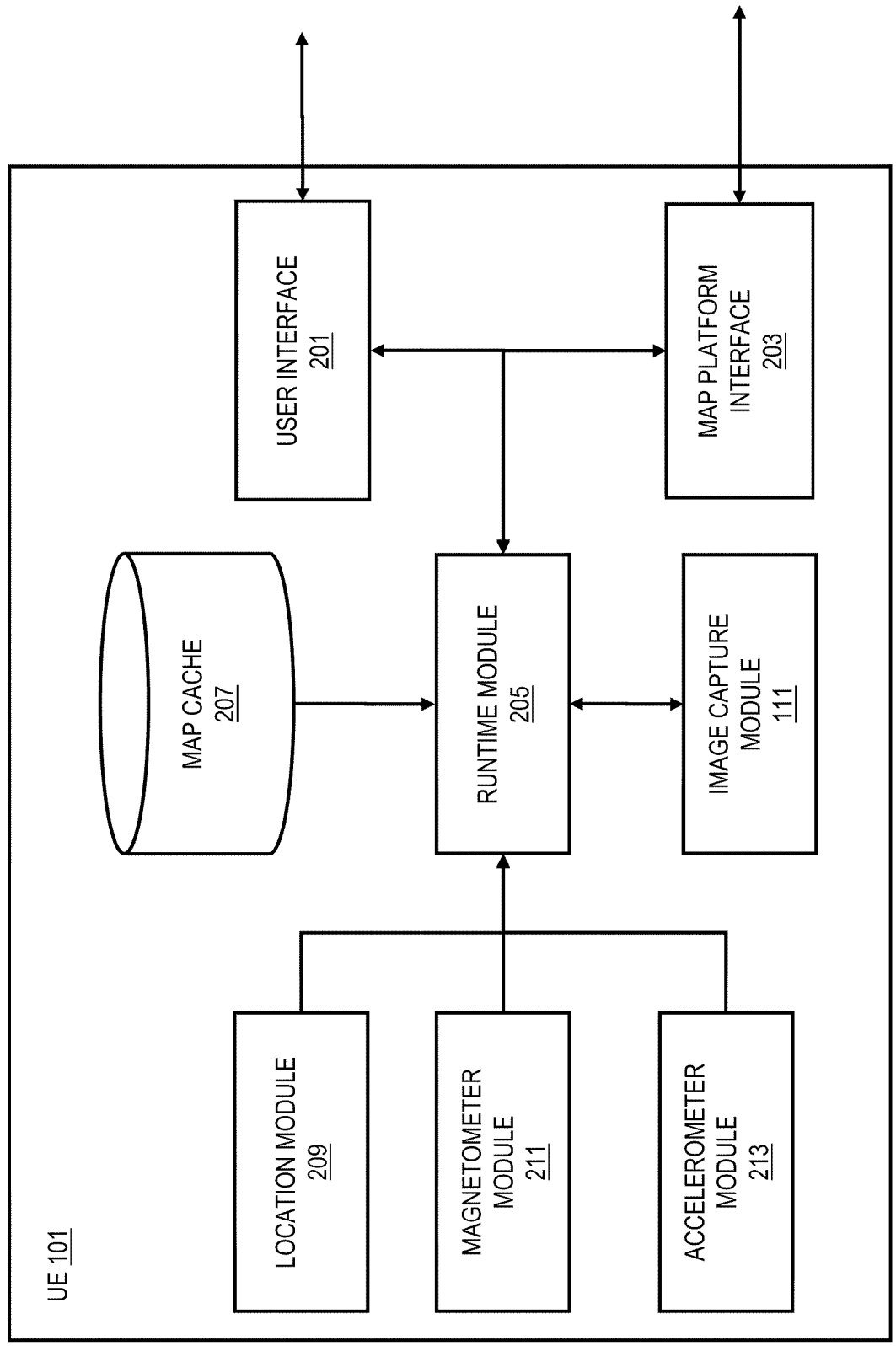
FIG. 2 is a diagram of the components of user equipment capable of presenting navigational information via transforming three dimensional map objects, according to one embodiment.

FIG. 2 is a diagram of the components of user equipment capable of presenting navigational information via transforming three dimensional map objects, according to one embodiment. By way of example, the UE 101 includes one or more components for presenting navigational information via transforming 3D map objects. It is contemplated that the functions of these components may be combined in one or more components or performed by other components of equivalent functionality. In this embodiment, the UE 101 includes a user interface 201 to present navigational information and receive input, a map platform interface 203 to retrieve map information from a map platform 103, a runtime module 205, a map cache 207 to store map information, a location module 209 to determine a location of the UE 101, a magnetometer module 211 to determine horizontal orientation of the UE 101, an accelerometer module 213 to determine vertical orientation of the UE 101, and an image capture module 111.

Navigational information may be presented to the user via the user interface 201, which may include various methods of communication. For example, the user interface 201 can have outputs including a visual component (e.g., a screen), an audio component (e.g., a verbal instructions), a physical component (e.g., vibrations), and other methods of communication. User inputs can include a touch-screen interface, microphone, camera, a scroll-and-click interface, a button interface, etc. Further, the user may input a request to start a navigation application 107 and utilize the user interface 201 to receive navigational information. Through the user interface 201, the user may request different types of navigational information to be presented. Further, the user may be presented three dimensional representation of particular locations and related objects (e.g., buildings, terrain features, POIs, etc. at the particular location) as part of a graphical user interface on a screen of the UE 101.

The map platform interface 203 is used by the runtime module 205 to communicate with the map platform 103. In some embodiments, the interface is used to fetch map information from the map platform 103. The UE 101 may utilize requests in a client server format to retrieve the map information. Moreover, the UE 101 may specify location information and/or orientation information in the request to retrieve the map information. The location module 209, magnetometer module 211, accelerometer module 213, and image capture module 111 may be utilized to determine location and/or orientation information used in retrieving map information. Further, this map information may be stored in a map cache 207 to be utilized in presenting navigational information to a user of the navigation application.

In one embodiment, the location module 209 can determine a user's location. The user's location can be determined by a triangulation system such as a GPS, assisted GPS (A-GPS) A-GPS, Cell of Origin, wireless local area network triangulation, or other location extrapolation technologies. Standard GPS and A-GPS systems can use satellites 113 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 209 may also utilize multiple technologies to detect the location of the UE 101. GPS coordinates can provide finer detail as to the location of the UE 101. As previously noted, the location module 209 may be utilized to determine location coordinates for use by the navigation application 107.

The magnetometer module 211 can include an instrument that can measure the strength and/or direction of a magnetic field. Using the same approach as a compass, the magnetometer is capable of determining the direction of a UE 101 using the magnetic field of the Earth. The front of the image capture device (e.g., a digital camera) (or another reference point on the UE 101) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is utilized to determine the orientation of the user. This directional information may be correlated with the location information of the UE 101 to determine where (e.g., at which building or other object(s)) the user is pointing towards. This information may be utilized to select a 3D object to perform a transformation upon to provide navigational information to the user.

Further, the accelerometer module 213 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 213 can determine the angle the UE 101 is pointed as compared to Earth's gravity. In one embodiment, vertical directional data obtained from an accelerometer is used to determine the angle that the user is pointing the UE 101 at. This information in conjunction with the magnetometer information and location information may be utilized to determine a viewpoint to provide map information to the user. As such, this information may be utilized in selecting 3D map objects to present navigational information to the user. Moreover, the combined information may be utilized to determine portions of a particular 3D map object that the user may be interested in or utilized for determining portions of the 3D map object to transform to provide navigational information to the user.

Images can be captured using an image capture module 111. An image capture module 111 may include a camera, a video camera, a combination thereof, etc. In one embodiment, visual media is captured in the form of an image or a series of images. The image capture module 111 can obtain the image from a camera and associate the image with location information, magnetometer information, accelerometer information, or a combination thereof. As previously noted, this combination of information may be utilized to determine the viewpoint of the user by combining the location of the user, horizontal orientation information of the user, and vertical orientation information of the user. This information may be utilized to retrieve map information from the map cache 207 or the map platform 103. In certain embodiments, the map cache 207 includes the information in the map database 109, a subset of the map database 109, or a superset of the map database 109.

Figure 3:
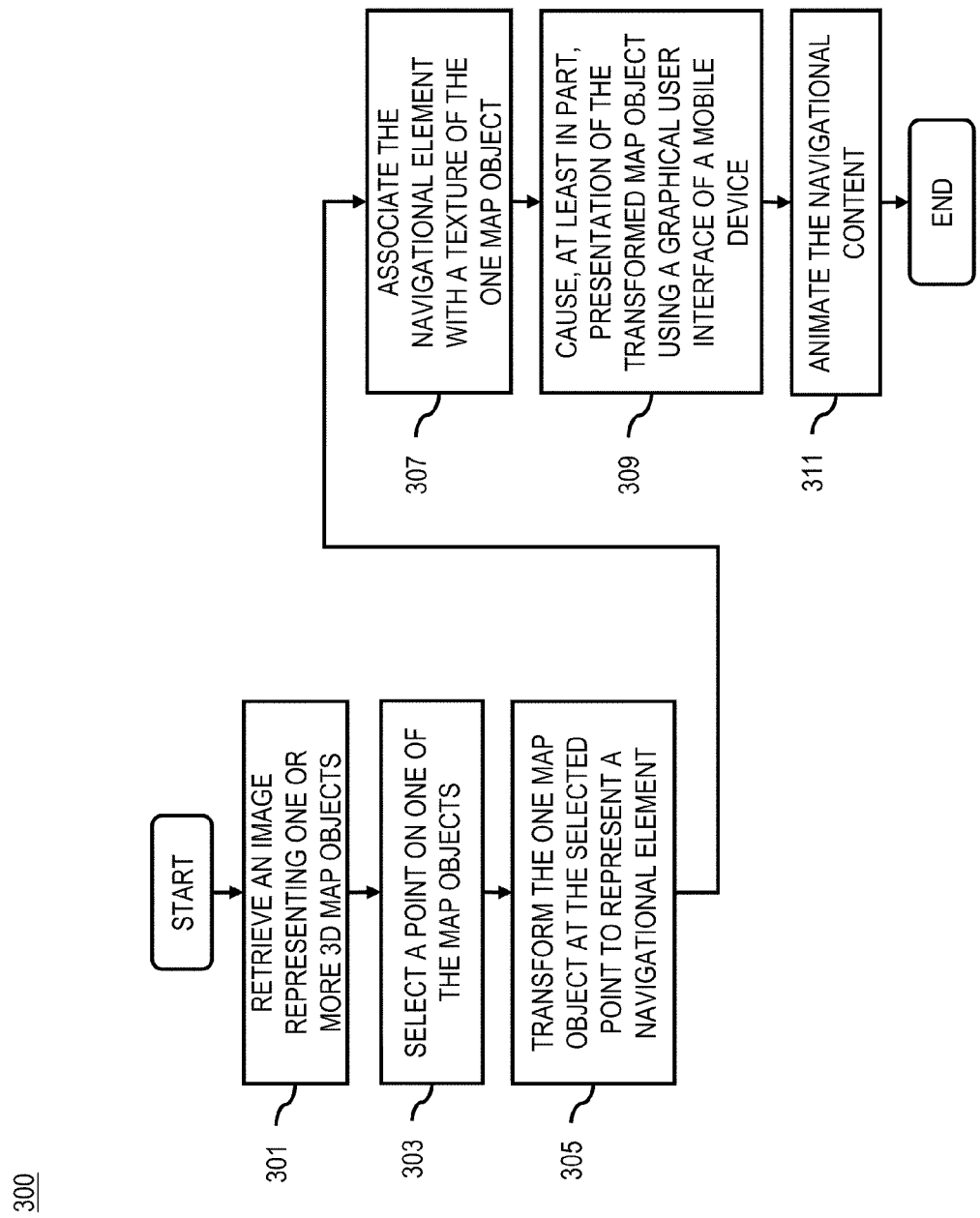
FIG. 3 is a flowchart of a process for presenting navigational information by transforming three dimensional map objects, according to one embodiment.

FIG. 3 is a flowchart of a process for presenting navigational information by transforming three dimensional map objects, according to one embodiment. In one embodiment, the runtime module 205 performs the process 300 and is implemented in, for instance, a chip set including a processor and a memory as shown FIG. 7. In certain embodiments, the map platform 103 may perform some or all of the steps of the process 300 and communicate with the UE 101 using a client server interface. The UE 101 may activate a navigation application 107 to utilize mapping services for presentation of navigational and mapping information. The navigation application 107 may execute upon the runtime module 205.

The runtime module 205 may utilize a location module 209, magnetometer module 211, accelerometer module 213, or a combination thereof to determine a viewpoint of the user as previously discussed. In other embodiments, the user may select the viewpoint based on a 3D environment. The user may select the viewpoint based on conventional means of searching a map or 3D map (e.g., by selecting a starting point and traversing the map or entering location coordinates, such as GPS coordinates or an address, of the viewpoint). From the selected viewpoint, an image representing one or more 3D map objects can be retrieved from the map cache 207 or the map platform 103 (step 301). As previously noted, the image may represent a physical environment, which may be captured using an image capture module 111 of the UE 101. The 3D map objects may be associated with structures (e.g., buildings) and other sites associated with the physical environment. In another embodiment, the image may represent a virtual 3D environment, where the user's location in the real world physical environment is represented in the virtual 3D environment. In the representation, the viewpoint of the user is mapped onto the virtual 3D environment. Moreover, a hybrid physical and virtual 3D environment may additionally be utilized to present navigational information to the user.

The navigation application 107 may determine what navigation information to present based on user preferences or other system parameters or settings (e.g., a default setting). In certain embodiments, the navigational information includes a type (or types) of POI (e.g., a coffee shop) that the user is searching for. In other embodiments, the navigational information may include a directional indicator to a location that the user is searching for (e.g., a friend, a particular POI, etc.). The location can be determined by querying the map platform 103, which may include location information for POIs and additionally may be capable of tracking the movement of people using dynamic positioning technology (e.g., by detecting the presence of a user via GPS information). A person may utilize a device that shares the location of the person with the map platform 103 (e.g., a user tracking service, a location-aware social networking service, etc.). From this shared location information, the map platform 103 and/or navigation application 107 may associate a 3D object with the person.

In one embodiment, the user may select a viewpoint for display in the user interface by use of a camera or other imaging device present in a user device. By way of example, the user may point the camera of the UE 101 at a physical object (e.g., a building) to retrieve information about the object or use the object as a reference point in determining directional information to the location indicated by the user. The physical object may be represented by one of the one or more 3D map objects associated with the retrieved image. As previously noted, the 3D map objects may include vertices or points of a 3D model. The runtime module 205 may then select a point on the 3D map object as a location to present navigational information (e.g., by transforming the 3D map object into another shape) from (step 303). Points on the 3D map object may be predetermined based on the map information. Moreover, the points may be determined based on certain criteria. For example, certain points on the 3D map object may be associated with POIs associated with the 3D map object. In one example, the 3D map object associated with a building might have a café on the top floor and a retail store on the ground floor of the building. A POI point (e.g., a point of the 3D map object associated with a POI used for transformation purposes) for the café may be on top of the 3D map object or associated with the top floor of the 3D map object to represent the location association. Moreover, the POI point for the retail store may be towards the bottom of the building. Additionally or alternatively, the points may be dynamically based on information associated with the location of the UE 101 and/or the location of a specified location that the user may want a directional indicator towards. In this scenario, the point may be determined based on a relationship between the map object and the specified location. For example, an arrow pointing towards a direction may utilize a point selected that is closest to the direction of the specified location.

Figure 4A:
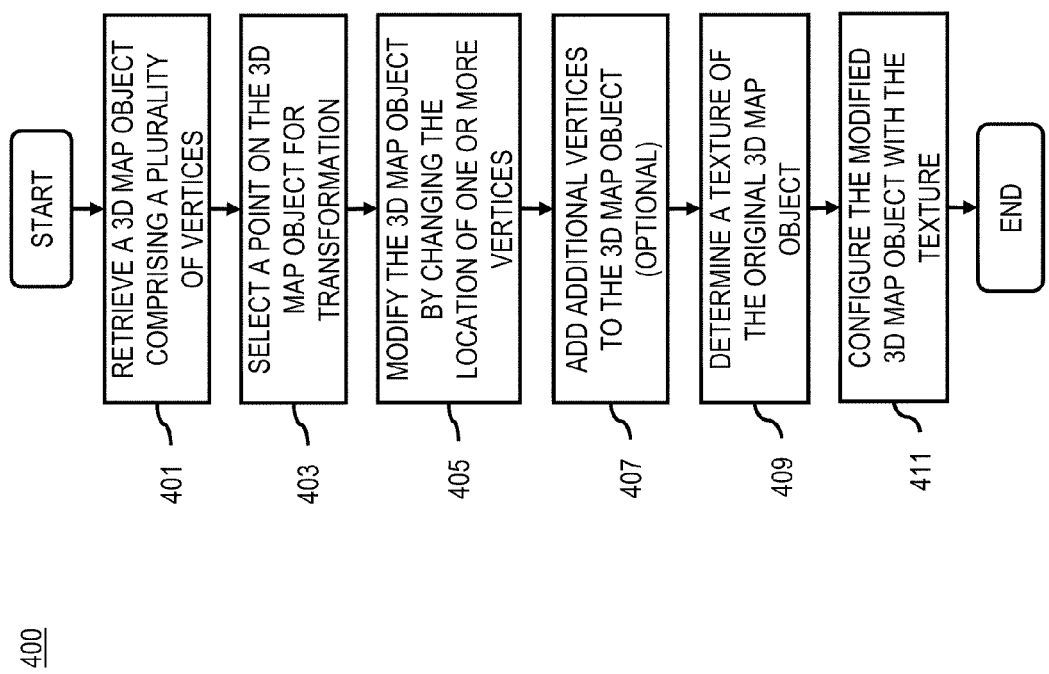
FIG. 4A is a flowchart of a process for transforming three dimensional map objects, according to one embodiment.

Then, at step 305, the runtime module 205 transforms the map object at the selected point to represent a navigational element. The navigational element may include a POI, POI type, direction of a specified location (e.g., a POI, a landmark, an address, location coordinates, etc.), other navigational parameter, or a combination thereof. Each navigational element may include an associated filter or transformation based on a modeling process (e.g., polygonal modeling) that can be utilized to transform the 3D object from the point into a transformed 3D map object that provides navigational information associated with the navigational element. For example, as shown in FIG. 5B, a building 3D map object may be transformed to include an arrow that looks to grow out of the building and towards a direction. In another example, the navigational element may include a POI icon and the 3D map object may be transformed to include the POI icon as shown in FIGS. 4A and 5C. Further, a POI icon may include additional features, such as presence information of a friend or other person or moving object with a known location (e.g., known GPS location that may be updated at the map platform 103). Thus, a friend may be utilized as a POI. This information may be utilized to add a representation of the friend to a 3D map object (e.g., a building, structure, park, etc.) of the friend. As such, a represented navigational element may protrude from the 3D map object as part of the transformed map object. Processes involving the transformation process are further detailed in the discussion of FIGS. 4A and 4B. In certain embodiments, the transformation includes a distortion of the original 3D map object to include the navigational element information.

Further, the 3D map object may be associated with a texture. For example, the 3D map object may have a granularity, skin, or wallpaper associated with the 3D map object. The texture may be associated with a physical environment or be specific to the virtual 3D map environment. The texture of the 3D map object may be associated with the texture of the transformed portion associated with the navigational element (step 307). As such, the user can easily associate the navigational element portion with the 3D map object. Alternatively or additionally, the texture may remain constant between the original 3D map object and the transformed map object, but the portion transformed may include a different shade or color to distinguish and highlight the navigational element information. Further, the texture may be animated to additionally highlight and distinguish the navigational element information. In certain examples, the animation may include movements of the texture, which may be implemented by using conventional animation techniques (e.g., utilizing multiple frames of the same texture to generate the animation or moving portions of the texture according to an algorithm).

Then, at step 309, the runtime module 205 causes, at least in part, presentation of the transformed map object using a graphical user interface of the UE 101 (e.g., a mobile device). Thus, the user may view the 3D map environment as well as the 3D map objects and transformed 3D map objects. The above mentioned steps may additionally be performed multiple times to present multiple transformed 3D map objects and/or multiple transformations of a single 3D map object. Further, as part of the transformation, the represented navigational element may be animated (e.g., moving arrow, turning POI, instrument being used, etc.) to highlight and draw attention towards the transformed 3D map object (step 311). The animation process may include a continuous transformation of the 3D map object or portion of the 3D map object.

Moreover, the animation may occur on a protruding portion of the transformed 3D map object. Further, the animation may be utilized to enlarge the navigational element information (e.g., POI or arrow) over time to ensure that the navigational element information is recognizable.

FIG. 4A is a flowchart of a process for transforming three dimensional map objects, according to one embodiment. In one embodiment, the runtime module 205 performs the process 400 and is implemented in, for instance, a chip set including a processor and a memory as shown FIG. 7. In certain embodiments, the map platform 103 may perform some or all of the steps of the process 400 and communicate with the UE 101 using a client server interface. Traditional 3D modeling may be utilized to transform the 3D map objects. For example, polygonal modeling, splines and patches modeling, primitives modeling, etc. may be utilized to transform the 3D map objects. In step 401, a 3D map object comprising a plurality of vertices is retrieved from a map cache 207 of a UE 101. The 3D map object may additionally or alternatively be retrieved from the map platform 103. A group of polygons may be connected together at shared vertices. This group may be considered a mesh giving structure to the 3D map object. Then, a point (e.g., a vertex) on the 3D map object is selected for transformation (step 403). The selection of the point may be determined as specified above in step 303 of FIG. 3 and/or be based on predetermined points of the 3D map object. The predetermined points may be stored associated with the 3D map object as metadata. Then, at step 405, the runtime module 205 modifies the 3D map object by changing the location of one or more vertices. For example, the selected vertex may be moved towards a direction and surrounding vertices may be moved along with the selected vertex. In certain embodiments, the surrounding vertices are transformed based on a filter or transformation associated with a navigational element as described above. The transformation or filter may include information on how to modify the geometry of the 3D map object to the desired shape. Further, the transformation or filter may include one or more conventional polygonal mesh operations, such as loft, extrude, revolve, add, subtract, union, intersect, attach, chamfer, deform, weighted deform, morph, bend, twist, displace, simplify, cut, stitch, convex hull, etc. Each navigational element may have this transformation or filter and each navigational element may be utilized to transform one or more 3D objects. Optionally, additional vertices may be added to the 3D map object to create the desired shape (step 407). This may help reduce distortion associated with the transforming.

Further, the runtime module 205 may determine a texture associated with the original 3D map object (step 409). This texture information may be stored in metadata associated with the 3D map object (e.g., a pattern, a skin, etc.). The texture information may be utilized to configure the modified or transformed 3D map object with the texture (step 411). In certain instances the texture may be placed over the mesh of the 3D map object. In other instances, the texture may be stretched based on the 3D map object. As previously noted, the texture may additionally be animated to highlight sections of the 3D map object.

Figure 4B:
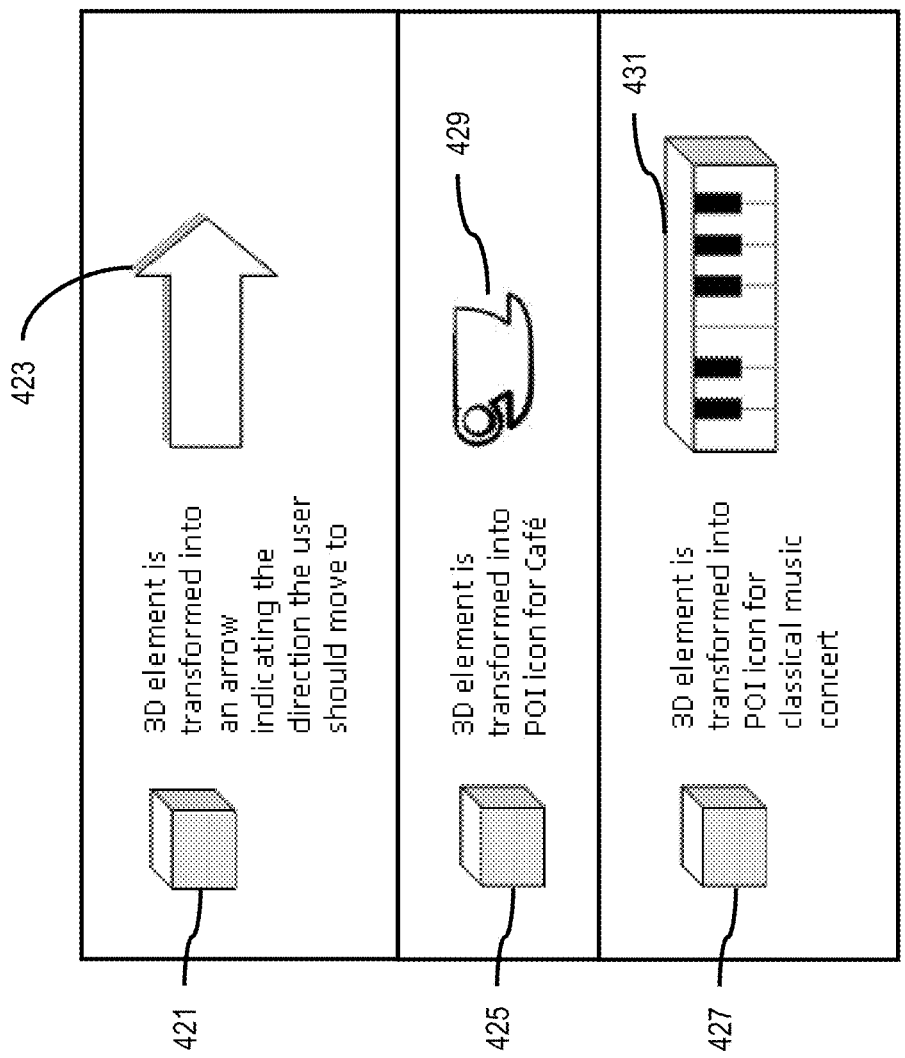
FIG. 4B is a diagram of exemplary transformations of three dimensional elements, according to various embodiments.
Figure 5C:
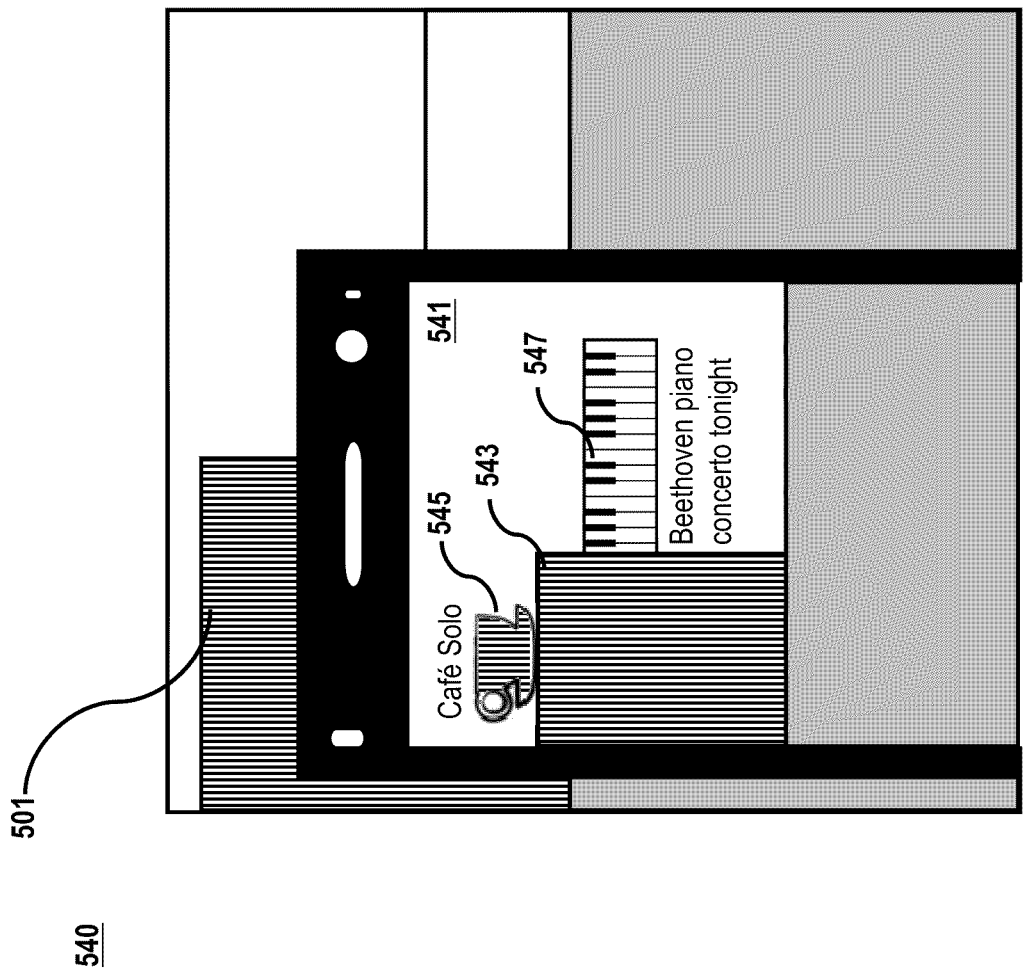

FIG. 4B is a diagram of exemplary transformations of three dimensional elements, according to various embodiments. As shown, a 3D element 421 (e.g., a portion of a 3D map object, a grouping of polygons creating a mesh, etc.) may be transformed to include an arrow 423. In certain embodiments, the 3D element 421 is transformed into a 3D arrow 423. As shown, the arrow 423 may indicate a direction that the user should move towards to arrive at a location. This arrow 423 may point to the actual destination itself or to a location on a route to the destination. Further, the transformation may be performed using a point or vertex of the 3D map element 421 as a basis. Alternatively or additionally, a group of vertices may be utilized to generate a transformed map object. Further, the size of the arrow 423 may be determined dynamically based on the size of the 3D map object and/or 3D element 421.

Moreover, 3D elements 425 and 427 may be transformed into POI icons 429, 431. As shown, a 3D element 425 may be transformed into a 3D café icon 429 using a transformation or filter. Rotating view of the transformed object can show different faces of the café icon 429. Moreover, 3D element 427 may be transformed into a POI icon 431 for a classical music concert. The mesh of the 3D element can be transformed to include the shape of the café icon 429 or the classical music POI icon 431. Further, in some embodiments, POI icons 429, 431 can take on the skin of the 3D element 425, 427 or 3D map object. Moreover, in some embodiments, a POI icon, such as the classical music POI icon 431 may have distinguishing properties (e.g., black piano keys) that do not take on the skin of the 3D map object. Alternatively, portions (e.g., white keys) of the POI classical music POI icon 431 may acquire characteristics of the skin, while other portions (e.g., black keys) do not. Further, in certain embodiments, the entirety of the 3D map object may be transformed into the POI icon. Additionally or alternatively, users may be able to add themes to the transformed map objects, distinguishing the transformed map object and/or a portion of transformed map object from other objects in the environment.

FIGS. 5A-5C are diagrams of user interfaces utilized in the processes of FIGS. 3 and 4A, according to various embodiments. FIG. 5A shows a physical environment 500 that the UE 101 may capture. In this embodiment, the physical environment may include a hall 501. The user may utilize the UE 101 to generate a 3D image 521 including a 3D object 523 of the hall 501 and other elements of the physical environment 520 on the UE 101. Moreover, the user may enter input selecting a location that the user is interested in reaching. For example, the user may want to arrive at Kiasma museum. The museum may be located 500 meters east of the hall 3D object 523. The hall 3D object can then be transformed to have a 3D arrow 525 point towards the Kiasma museum. As shown, the 3D arrow 525 appears to grow out of the hail 3D object 523. In certain embodiments, the 3D arrow 525 may emulate the texture or style of the hall 3D object 523 to seamlessly grow out of the hall 3D object 523. For example, the 3D arrow 525 might be decorated with an Art Deco style if the hall 3D object is associated with an Art Deco style. Further, text 527 associated with the transformed object may be presented to the user. For example, this text 527 may indicate instructional information on how to arrive at Kiasma. Moreover, in the embodiment of FIG. 5C, which shows a physical environment 540, the user utilizes the navigation application 107 to display POIs associated with the hall in a graphical user interface 541. The navigation application 107 determines that there are two POIs that the user may be interested in within the hall 3D object 543. A first POI can be represented with the Cafe Solo POI icon 545. This POI may be associated with a top level of the hall 3D object 543. Thus, the hall 3D object can be transformed to include the Cafe Solo POI icon 545. As shown, the Cafe Solo 545 icon takes on the appearance (e.g., the wall markings) of the hall 3D object 543.

Further, a second POI can be represented simultaneously by transforming a second portion of the hall 3D object 543 to include a piano 3D object 547. Further, the transformation includes the ability of the piano 3D object 547 to seem to grow out or protrude from the hall 3D object 543. The POI icons can further be transformed to be augmented depending on the point of view of the UE 101.

With the above approaches, a user is able to leverage technology to advantageously retrieve navigational information. As such, the user can more easily understand the surrounding physical environment (e.g., a city, suburban area, etc.). In this manner, the user is naturally able to associate 3D model objects with the physical environment as well as transformations and extensions of the 3D objects, thereby making it less likely that the user would overlook the presented navigation information. Thus, the user is presented associations of 3D objects with the corresponding navigation information in a seamless manner by transforming the 3D objects. These improvements of user experience are additionally capable of causing a "WOW" effect and exciting the user to talk about the mapping features of the UE 101 to other potential users. Moreover, the 3D objects allow for depth and context while turning the map to view the 3D object from different views or angles. Further, utilizing actual 3D objects as a base for transformations instead of retrieving additional POI icons allows for a reduction in downloads from the map platform 103, which can save bandwidth for both the user and the service providing communications.

The processes described herein for providing a user interface presenting navigational information may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
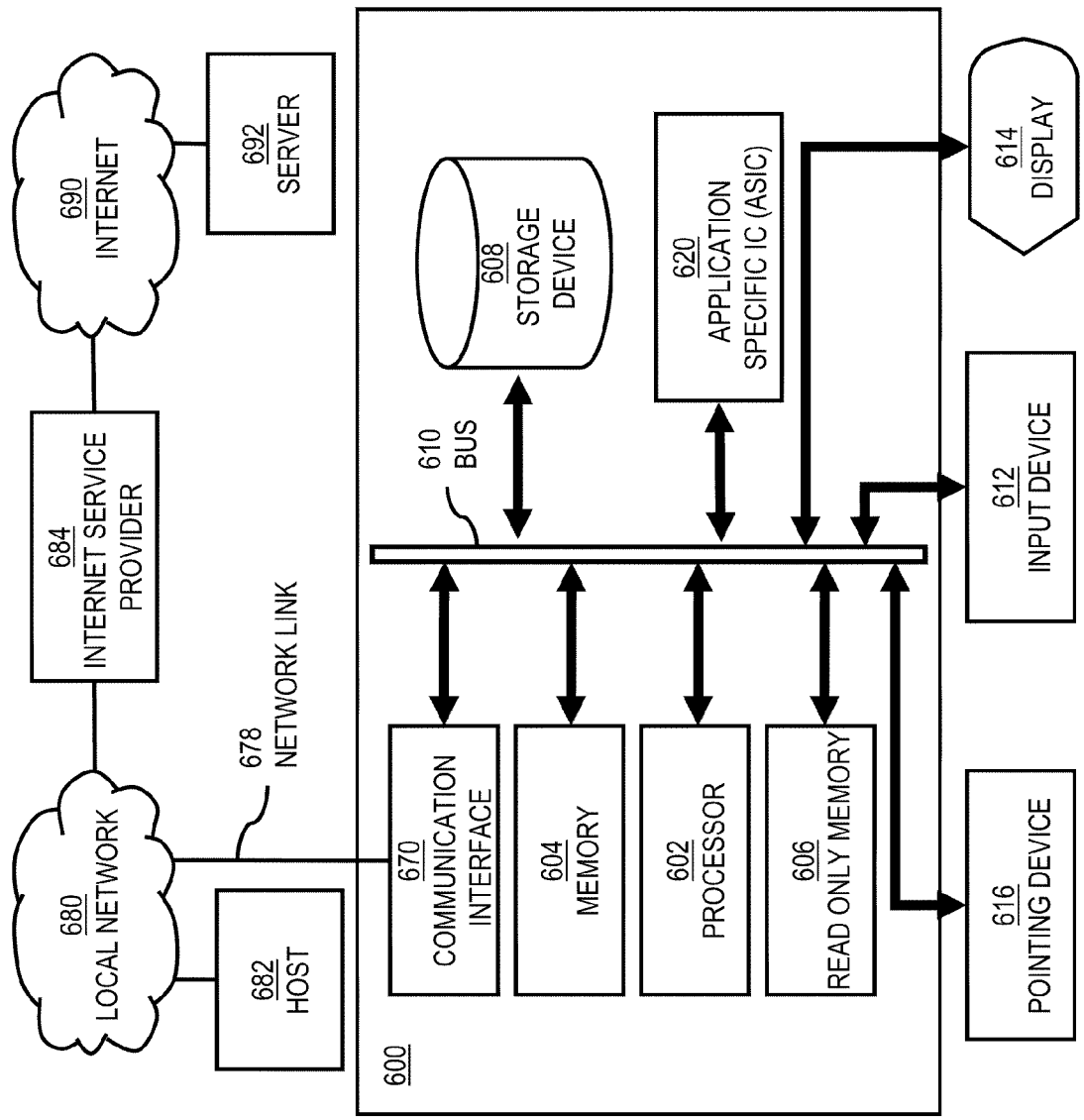
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide a user interface presenting navigational information as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and nonzero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing a user interface presenting navigational information.

A bus 610 includes one or more parallel conductors of information so that information is transferred quickly among devices coupled to the bus 610. One or more processors 602 for processing information are coupled with the bus 610.

A processor 602 performs a set of operations on information as specified by computer program code related to providing a user interface presenting navigational information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for providing a user interface presenting navigational information. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing a user interface presenting navigational information, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing map information to the UE 101.

The term "computer-readable medium" as used herein to refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
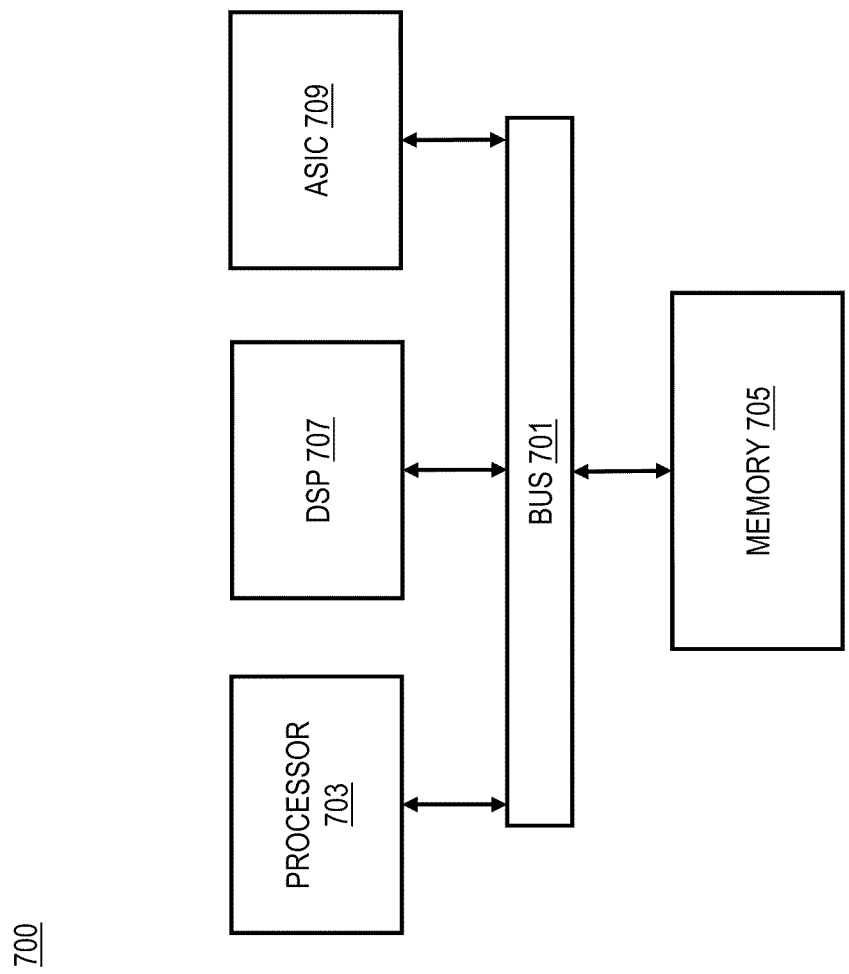
FIG. 7 is a diagram of a chip set that can be used to implement an embodiment of the invention.

FIG. 7 illustrates a chip set 700 upon which an embodiment of the invention may be implemented. Chip set 700 is programmed to provide a user interface presenting navigational information as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 700, or a portion thereof, constitutes a means for performing one or more steps of providing a user interface presenting navigational information.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide a user interface presenting navigational information. The memory 705 also stores the data associated with or generated by the execution of the inventive steps.

Figure 8:
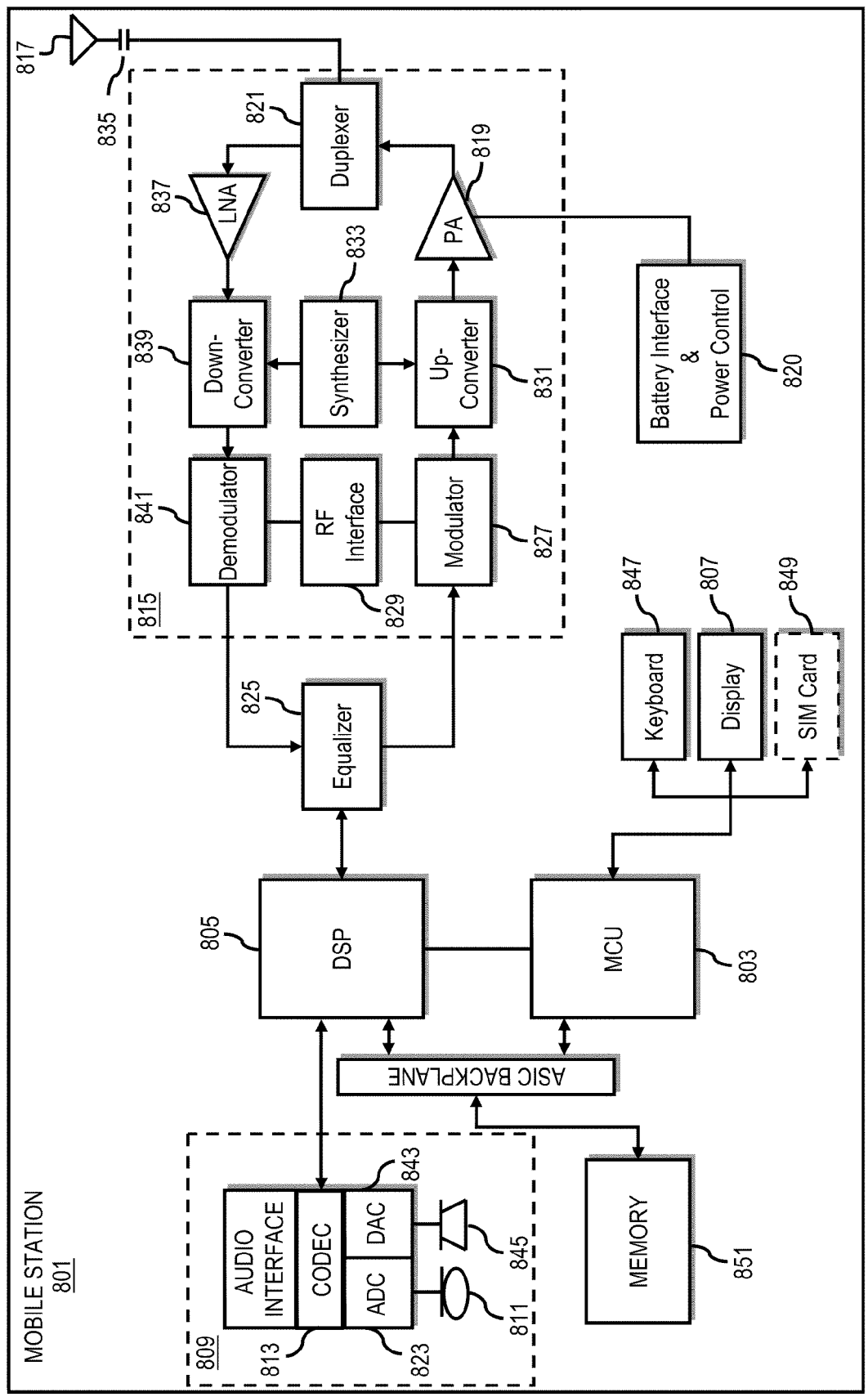
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile station 801, or a portion thereof, constitutes a means for performing one or more steps of providing a user interface presenting navigational information. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing a user interface presenting navigational information. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide a user interface presenting navigational information. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   retrieving from a memory via a process, an image representing one or more three dimensional map objects;
   selecting a point on one of the map objects;
   transforming, via the processing, the one map object at the selected point to represent a navigational element; and
   causing, at least in part, presentation of the transformed map object using a graphical user interface of a mobile device,
   wherein the represented navigational element protrudes from the one map object as part of the transformed map object.

2. A method of claim 1, further comprising:
   receiving a request for a search for a point of interest type;
   determining the point of interest is associated with the one map object, wherein the navigational element includes a three dimensional icon associated with the point of interest.

3. A method of claim 1, wherein the one map object is associated with a texture, the method further comprising:
   associating the navigational element with the texture.

4. A method of claim 1, wherein the image represents a physical environment, the method further comprising:
   associating the one map object with the physical environment.

5. A method of claim 1, further comprising:
   animating the protruding represented navigational element.

6. A method of claim 1, further comprising:
   receiving input specifying a location, wherein the navigational element includes a directional indicator towards the location.

7. A method of claim 1, further comprising:
   selecting another point on another map object;
   transforming the other map object at the selected other point to represent another navigational element; and
   causing, at least in part presentation of the other transformed map object using the graphical user interface.

8. An apparatus comprising:
   at least one processor; and
   at least one memory including computer program code,
   the at least one memory and the computer program code configured to, with the at least one processor, cause the apparatus to perform at least the following, retrieve an image representing one or more three dimensional map objects;

select a point on one of the map objects;

transform the one map object at the selected point to represent a navigational element; and cause, at least in part, presentation of the transformed map object using a graphical user interface of a mobile device, wherein the represented navigational element protrudes from the one map object as part of the transformed map object.

9. An apparatus of claim 8, wherein the apparatus is further caused, at least in part, to:

receive a request for a search for a point of interest type;

determine the point of interest is associated with the one map object, wherein the navigational element includes a three dimensional icon associated with the point of interest.

10. An apparatus of claim 8, wherein the one map object is associated with a texture, and wherein the apparatus is further caused, at least in part, to:

associate the navigational element with the texture.

11. An apparatus of claim 8, wherein the image represents a physical environment, and wherein the apparatus is further caused, at least in part, to:

associate the one map object with the physical environment.

12. An apparatus of claim 8, wherein the apparatus is further caused, at least in part, to:

animate the protruding represented navigational element.

13. An apparatus of claim 8, wherein the apparatus is further caused, at least in part, to:

receive input specifying a location, wherein the navigational element includes a directional indicator towards the location.

14. An apparatus of claim 8, wherein the apparatus is further caused, at least in part, to:

select another point on another map object;

transform the other map object at the selected other point to represent another navigational element; and cause, at least in part presentation of the other transformed map object using the graphical user interface.

15. An apparatus of claim 8, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

16. A non-transitory computer-readable storage medium carrying one or more sequences of one or more instructions which, when executed by one or more processors, cause an apparatus to at least perform the following steps:

retrieving an image representing one or more three dimensional map objects;

selecting a point on one of the map objects;

transforming the one map object at the selected point to represent a navigational element; and causing, at least in part, presentation of the transformed map object using a graphical user interface of a mobile device, wherein the represented navigational element protrudes from the one map object as part of the transformed map object.

17. A non-transitory computer-readable storage medium of claim 16, wherein the apparatus is caused, at least in part, to further perform:

receiving a request for a search for a point of interest type;

determining the point of interest is associated with the one map object, wherein the navigational element includes a three dimensional icon associated with the point of interest.

18. A non-transitory computer-readable storage medium of claim 16, wherein the one map object is associated with a texture, and wherein the apparatus is caused, at least in part, to further perform:

associating the navigational element with the texture.

19. A non-transitory computer-readable storage medium of claim 16, wherein the image represents a physical environment, and wherein the apparatus is caused, at least in part, to further perform:

associating the one map object with the physical environment.

20. A non-transitory computer-readable storage medium of claim 16, wherein the apparatus is caused, at least in part, to further perform:

animating the protruding represented navigational element.

* * * * *